Patented Sept. 9, 1947

2,426,994

UNITED STATES PATENT OFFICE 2,426,994

SULPHUR CURED UNSATURATED POLYESTERS

Carl J. Frosch, Summit, N. J., assignor to Bell Telephone Laboratories, Incorporated, New York, N. Y., a corporation of New York No Drawing. Application April 30, 1943, Serial No. 485,160

11 Claims. (Cl. 260—75)

This invention relates to the sulphur cured high molecular weight condensation polymers.

It has been proposed to cure the liquid or fusible, essentially linear polyesters of high molecular weight containing olefinic unsaturation by heating them with benzoyl peroxide or substances having a similar action. The resultant products are infusible and insoluble and are rubbers, microcrystalline solids, glassy solids or flexible substances of low elongation, depending upon the degree of crystallinity of the polyester, its degree of unsaturation and its viscosity, if liquid.

The present invention is based primarily upon the discovery that these polyesters may also be cured, if they possess a sufficient degree of unsaturation, by heating them with sulphur, and particularly upon the discovery that valuable synthetic rubbers may be produced in this manner from suitable polyesters. The invention is also based on the discovery that similar sulphur vulcanization of unsaturated essentially linear polyamides and other condensation polymers produces valuable products including rubber-like materials. Since this sulphur vulcanization is of the greatest practical importance in connection with the production of rubber-like polymers from polyesters, it is in this regard that the invention will first be described.

These synthetic rubbers are prepared by the sulphur vulcanization of polyesters of fairly high molecular weight which contain a definite proportion of non-benzenoid unsaturation and which possess insufficient crystallinity to render them brittle or excessively rigid at room temperatures. These polyesters are prepared by the esterification of one or more glycols with one or more dicarboxylic acids, at least one of the reactants containing non-benzenoid unsaturation, or by the esterification of one or more monohydroxy monocarboxylic acids, at least one of these hydroxy acids containing non-benzenoid unsaturation.

Since unsaturated dicarboxylic acids are more available than unsaturated glycols or unsaturated hydroxy acids, the unsaturated polyesters are most readily prepared from saturated glycols and unsaturated acids, such as maleic, fumaric, itaconic, mesaconic, muconic or dihydromuconic acid. The degree of unsaturation in the polyester may be controlled by using a mixture of dicarboxylic acids, one of which contains no non-benzenoid unsaturation and the other of which contains non-benzenoid unsaturation, or in particular olefinic unsaturation. In any event, the reactants chosen are those which in the absence of unsaturated bonds would, upon esterification, form strictly linear polyesters.

The esterification of these reactants is conducted under conditions such that the maximum linear esterification takes place with the least possible cross-linking of the linear ester chains at the unsaturated bonds. However, when large amounts of unsaturation are present, the reaction mixture will ultimately gel because of this cross-linking reaction, regardless of how carefully the esterification is conducted. The reaction must be interrupted before substantial gelation has occured so that the resulting polyester will be sufficiently fluid or plastic to permit compounding with sulphur and other substances. The degree to which esterification can be carried out before the reaction is stopped will be the most important factor in determining the tensile strength of the cured rubber. The maximum degree of esterification which is obtainable under identical reaction conditions will decrease as the amount of unsaturation is increased.

In defining the theoretical amount of unsaturation in a polyester produced from bifunctional reactants, it is convenient to assume that the esterification takes place without cross-linking at the double bonds and to define the degree of unsaturation as the ratio of the number of unsaturated carbon-to-carbon bonds to the number of atoms in the linear chain of the average theoretical linear polyester molecule. Although a polyester containing as few as one olefinic bond per three hundred and fifty atoms in the linear chain, calculated as above, undergoes a definite vulcanizing action, the product is usually substantially undercured and possesses a low modulus of elasticity. When the polyester contains between about 3 and about 13 olefinic bonds per four hundred atoms in the linear chain, a rubber having a moderate tensile strength and good elongation is produced upon curing with sulphur. The most useful rubbers possess a degree of unsaturation falling within this range. As the degree of unsaturation increases beyond this point, the elongation decreases until the product loses most of its rubber-like reversible elasticity if completely cured. At high degrees of unsaturation the elongation may be improved somewhat by curing with a limited amount of sulphur.

When the polyester is prepared from saturated glycols and from a mixture of saturated dicarboxylic acids and dicarboxylic acids containing olefinic unsaturation, a definite vulcanizing action is obtained, although the product is undercured, when the unsaturated acid constitutes about 4 mol per cent of the total dicarboxylic acid mixture. Complete cure, yielding products of good elongation and reasonable modulus of elasticity, is obtained when the unsaturated dicarboxylic acid constitutes between about 10 mol per cent and about 25 mol per cent of the total dicarboxylic acid mixture.

In order to secure the greatest tensile strength, the polyesters from which the cured products are prepared are carried to the highest possible degree of esterification which can be achieved without excessive gelation. The degree of esterification which can be reached can be increased by limiting the temperature at which the esterification takes place, by incorporating an antioxidant in the reaction mixture, and by employing a technique which keeps at a minimum the time required for a given degree of esterification at a given temperature. To minimize cross-linking, all oxygen must be excluded from the reaction mixture. The water generated by esterification will be quickly removed and the rate of reaction thus increased considerably by bubbling an inert gas, such as dry, oxygen-free hydrogen, through the reaction mixture, preferably with the application of reduced pressure, at least during the later stages of the reaction.

When the polyester is prepared from glycols and dicarboxylic acids, it is desirable to use initially a large excess of glycol, preferably an excess greater than 20 mol per cent and up to several hundred mol per cent, and to carry out the reaction initially at atmospheric pressure in a reaction vessel equipped with a reflux condenser maintained at a temperature such as to allow escape of the water vapor while retaining the greater portion of the excess glycol. The bubbling of dry, oxygen-free hydrogen continuously through the reaction mixture will facilitate the reaction. The excess glycol forces esterification rapidly to substantial completion with the formation of relatively low molecular weight polyesters having hydroxyl endings.

The molecular weight can then be raised by removing the reflux condenser and continuing the reaction under reduced pressure while continuing the bubbling of hydrogen. In this latter stage of the reaction, the molecular weight increases rapidly through ester interchange and the glycol thus generated is distilled off. This procedure permits esterification in a consistently small time. It is more particularly described in the copending application of J. B. Howard, Serial No. 492,155, filed June 24, 1943.

Polyesters thus produced will form cured rubbers having good reversible elasticity only if the polyesters are capable of flow at room temperatures or at temperatures not substantially above room temperatures. Since polyesters possessing a high degree of crystallinity are essentially rigid, good rubbers can be obtained only from polyesters which are essentially non-crystalline at room temperatures.

Polyesters which possess a small amount of crystallinity, sufficient substantially to destroy their property of flow under moderate stress at room temperature, are, nevertheless, suitable for the formation of rubbers provided their crystallinity is not sufficient to render them hard and brittle and provided their crystalline melting point is not greatly above room temperature. The crystallinity of such polyesters is reduced by the process of vulcanization so that in many cases they may behave, at room temperatures, not substantially different from the cured polyesters which were originally viscous liquids. Even when the crystallinity remaining after vulcanization is sufficient to render the products boardly at room temperature or below, these substances are not brittle since the heat generated by distortion under stress is sufficient to reduce or destroy the crystallinity rapidly and thus produce true rubber-like behavior very shortly after the application of stress. These partially crystalline polyesters possess an advantage over the viscous liquid polyesters in that, prior to curing, they may be stored or shipped without becoming adhered to their containers.

In producing such non-crystalline polyesters or polyesters of limited crystallinity, advantage is taken of the fact that certain ingredients lead to polyesters which are incapable of crystallization or which have crystalline melting points below room temperatures, or which crystallize so slowly that for practical purposes they may be considered permanently non-crystalline.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, heteroatoms or unsaturated carbon-to-carbon bonds, the polyesters become less crystalline. The presence of aromatic rings also in general reduces the crystallinity.

Therefore, polyesters, prepared by reacting glycols with dicarboxylic acids, where either one of the constituents has frequently occurring or large side chains, or contains large amounts of nonbenzenoid unsaturation or aromatic rings or heteroatoms in the linear chain, are usually non-crystalline. However, if the other member of the reaction mixture is a polymethylene glycol or a polymethylene dicarboxylic acid, the crystallizing tendencies of the polyester increase as the length of the polymethylene chain increases. Thus dihydromuconic acid forms a non-crystalline polyester with ethylene glycol, but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol or methylethylene glycol. This glycol forms non-crystalline polyesters with polymethylene dicarboxylic acids between succinic acid and sebacic acid. Polyisopropylene succinate does not become excessively crystalline when as much as 50 per cent or 60 per cent of the isopropylene glycol is replaced by ethylene glycol. With isopropylene sebacate, however, no more than about 30 per cent of ethylene glycol can be substituted for the isopropylene glycol without inducing excessive crystallization.

The most available of the non-crystalline polyester-forming reactants containing hetero-atoms are diethylene glycol and diisopropylene glycol. Diglycolic acid is also of some interest as a heteroatom containing compound. The most available of the aromatic ring containing reactants is phthalic acid.

Trimethylene glycol and glutaric acid, both of which contain three methylene groups between their functional end groups, form polyesters with the shorter chain polymethylene glycol and polymethylene dicarboxylic acids, which crystallize exceedingly slowly and are, therefore, useful for forming certain of the cured synthetic rubbers of the present invention.

Another factor influencing crystallinity, aside from the molecular structure of the individual constituents, is the degree of order in the polyester molecules. The most ordered molecules having the most regular polar group spacing, all other factors being equivalent, are the most crystalline. Thus the greater the number of glycols and the greater the number of dicarboxylic acids or the greater the number of hydroxy acids used in preparing the polyester, the less will be the tendency to crystallize. In a polyester prepared from ethylene glycol and equimolar amounts of sebacic and succinic acids, or similar polyesters in which maleic acid is substituted for portions of the succinic acid, the disorder imparts sufficient non-crystallinity to permit the polyester to be used for the purposes of the present invention.

Even though a polyester is non-crystalline, the utility of the cured product may be limited by its brittle point. The temperature, below which the cured rubber becomes brittle, is closely associated with the temperature at which the viscosity of the polyester becomes so great that the material no longer flows readily under pressure but becomes instead a brittle, glassy substance. The degree to which a rubber must be capable of being cooled before becoming brittle is dependent upon the use to which it is to be put. However, substances having brittle temperatures at or above room temperature are obviously of limited utility since their rubber-like properties can be taken advantage of only at elevated temperatures.

The non-crystalline polyesters formed predominantly from polymethylene glycols and polymethylene dicarboxylic acids, and from such glycols and dicarboxylic acids having substituted alkyl side chains, form cured products which invariably have brittle points well below room temperature. However, those polyesters made from reaction mixtures in which the dicarboxylic acid is almost phthalic acid are usually brittle at room temperature and form cured products which have a brittle point considerably above room temperature. Therefore, when polyesters for forming rubber-like substances are made from phthalic acid, the phthalic acid in general should be diluted considerably with some other dicarboxylic acid, such as a polymethylene dicarboxylic acid, which will lower the brittle point.

In general, the brittle point occurs at higher temperatures as the concentration of groups having polar activity increases in the polyester. Thus, among the polymethylene glycols and dicarboxylic acids, those having the longer polymethylene chains tend to form the polyesters having the lower brittle points.

The vulcanization process of the present invention is carried out with these polyester gums by milling the polyesters, preferably on cold rolls, with sulphur together with any other compounding ingredient which is to be employed, such as the common rubber vulcanizing accelerators, mineral fillers and pigments, softeners, antioxidants or other common compounding ingredients. Any ingredients of a definitely acid or alkaline nature should be avoided. The compounded polyester is then heated in a rubber mold to a temperature sufficient to effect curing.

The amount of sulphur employed is not critical. Ordinarily from 1 per cent to 3 per cent by weight of sulphur will be sufficient. The ordinary sulphur vulcanization accelerators used with natural rubber have been found to produce a corresponding acceleration of curing with the polyesters. These accelerators may be employed in any suitable amount.

The most suitable curing temperatures will ordinarily be found to lie between about 120° C. and about 150° C. The time required for cure will vary with the degree of unsaturation, the amount of sulphur, the kind and amount of accelerator and the curing temperature.

The rubbers produced as described above may be used for most of the uses to which natural and synthetic rubbers are put. They possess an excellent resistance to gasoline and hydrocarbon oils, being far superior to natural rubber and superior to other synthetics in this respect. They are resistant to many corrosive substances such as sulphur, chlorine and fluorine, which rapidly deteriorate other rubber-like materials. They have a superior resistance to dry heat, particularly in the absence of oxygen. By a proper choice of polyesters, cured substances may be obtained having brittle points approaching those of natural rubber. Because of the extreme plasticity of the uncured polyesters, excellent intricate moldings can be obtained.

The present invention is not limited to the manufacture of those products which are rubber-like in their properties. Rigid polyesters of substantial crystallinity may be prepared and cured in the same manner to form infusible, insoluble, rigid crystalline polyesters, which above their crystalline melting points may have rubber-like properties. Polyesters, such as the phthalate maleates, which are fusible, brittle glasses at room temperature may also be cured in the same manner to an infusible, insoluble state. In each case it is necessary that the degree of unsaturation be above the minimum required for vulcanization as set forth above.

When the uncured polyester can be reduced to a fluid or plastic state below the curing temperature, the sulphur and other compounding ingredients can be introduced by a simple milling process at the required temperature. When the polyesters cannot be reduced to a plastic state below the curing temperature, the sulphur and other compounding ingredients may be incorporated in solution in a suitable solvent. Such solutions, whether formed from normally liquid or normally crystalline polyesters, are useful for forming impregnated fabrics.

In general, any polyesters may be cured according to the present invention if they contain a sufficient amount of unsaturation, as indicated above, and if they may be prepared by esterifying bifunctional reactants which, if the unsaturation were not present, would form strictly linear polyesters and which possess the formula X—R—Y, where X and Y are either hydroxyl or carboxyl groups and where R is a divalent organic radical containing no groups which would interfere with the cure, the free valences of R arising from carbon atoms which are not members of an aromatic ring. The most stable polymers are formed when R is a divalent hydrocarbon radical, but obviously R may contain either linkages, sulphur linkages, acetal linkages, imino or substituted imino linkages, amide linkages, or other groups, either in the linear chain or in side chains. Particularly when rubber-like polymers are formed, R will most commonly be limited to divalent aliphatic hydrocarbon residues, and those hydrocarbon residues which are saturated will most commonly be polymethylene groups and alkyl substituted polymethylene groups.

As indicated above other condensation polymers containing other types of condensation linkages together with or completely in place of polyester linkages may be cured with sulphur if they contain the minimum amounts of unsaturation referred to above. Since the amide and ester linkages are the most stable of the condensation linkages and the most readily formed, the present invention is applied with most advantage to the unsaturated polyamides, the unsaturated polyesters and the unsaturated polymers containing both ester and amide linkages as the only condensation linkages or as the essential condensation linkages.

The preparation of unsaturated polyamides from diamines and dicarboxylic acids, or from monoamino monocarboxylic acids, one of which contains unsaturation, is described in United States Patent 2,174,619, issued October 3, 1939, to W. H. Carothers. These polyamides may be cured with sulphur as described above. The amount of unsaturation may be reduced and the degree of linear growth of the uncured polyamide increased, with the advantages referred to above, by reacting a saturated diamine with a mixture of saturated and unsaturated dicarboxylic acids, by reacting a saturated dicarboxylic acid with a mixture of saturated and unsaturated glycols, or by reacting a saturated amino acid with an unsaturated amino acid.

As in the case of the polyesters, the properties of the cured polyamides depends upon the properties of the original polyamide. Rubbers of moderate tensile strength and good reversible elasticity may be prepared from polyamides possessing the degrees of linear growth and degrees of unsaturation described above for the polyester rubbers, provided the polyamides are viscous liquids at normal temperatures.

Since the polyamides which contain no substituents on their amide nitrogens have a greater tendency than the polyesters to be non-fluid, even when amorphous, due to the higher intermolecular forces, it is often necessary to form the polyamides from secondary diamines when rubber-like cured products are desired. Disecondary diamines or primary-secondary diamines alone may be reacted with dicarboxylic acids or a sufficient amount of these diamines may be mixed with di-primary diamines to insure a polyamide which is readily deformable at normal temperatures.

The nature of the substituent on the secondary amino group is not important so long as the polyamide of the desired degree of linear growth is capable of being formed. The substituent will most commonly be a methyl group, although any alkyl group, or any hydrocarbon group or in general any organic radical will be suitable.

A rubber-forming polyamide may be formed, for instance, by reacting N,N'-dimethyl hexamethylene diamine, under linear polyamide forming conditions, with an equimolar amount of a mixture made up of 75 mol per cent adipic acid and 25 mol per cent dihydromuconic acid. The resulting polyamide, when cured with 3 per cent sulphur forms a product of moderate strength and rubber-like elasticity.

The following specific examples will illustrate the manner in which the present invention may be practiced.

Example 1

363.6 grams of commercial sebacic acid, 19.6 grams of maleic anhydride, 142 grams of isopropylene glycol and 38.3 grams ethylene glycol, together with 9.4 grams phenyl alpha naphthylamine as an antioxident, were heated for seventeen hours at 210° C. in a reaction vessel equipped with a reflux condenser maintained at 110° C., while dry, oxygen-free hydrogen was continuously bubbled through the reaction mixture. The reflux condenser was then removed and the heating was continued under an absolute pressure of 6 millimeters of mercury, the bubbling of hydrogen being continued. After seven hours of vacuum treatment, a dark-colored, viscous polymer, which was partly gelled, was removed. A sample of 100 parts of this material was compounded with 75 parts Kalvan (ultra-fine calcium carbonate), 3 parts sulphur and 1 part tetramethylthiuramdisulphide. The mixture was cured for thirty minutes at 150° C. in the form of a thin sheet. A soft, rubbery sheet was produced which had a tensile strength of 1160 pounds per square inch and an elongation at break of 570 per cent.

Example 2

A polyester was prepared in the manner described in Example 1, using 202 grams commercial sebacic acid, 70 grams succinic anhydride, 29.4 grams maleic anhydride and 248 grams ethylene glycol together with 2.5 grams phenyl beta naphthylamine as an antioxidant. The reaction temperature was 200° C. and the vacuum treatment was continued for eighteen hours. A sample of 100 parts of the polyester gum which was produced was compounded with 75 parts Kalvan, 3 parts sulphur and 1 part tetramethylthiuramdisulphide. The mixture was cured for thirty minutes at 155° C. The cured product had a tensile strength of 1125 pounds per square inch and a 370 per cent elongation at break.

Example 3

A polyester was prepared as described in Example 1, using 343.4 grams commercial sebacic acid, 29.4 grams maleic anhydride, 142.5 grams isopropylene glycol and 38.8 grams ethylene glycol, together with 5 grams phenyl beta naphthylamine as an antioxidant. The reaction temperature was 200° C. and the vacuum treatment was continued for twenty-nine hours. A sample of 100 parts of the product was compounded with 75 parts Kalvan, 1.5 parts sulphur and 1 part tetramethylthiuramdisulphide, and was cured forty-five minutes at 150° C. The product was a soft, rubbery sheet with good nerve and return. The tensile strength was 1,550 pounds per square inch and the elongation at break was 530 per cent. A sample of 100 parts of the uncured polyester, compounded with 50 parts Kalvan, 50 parts Kosmobile 77 (carbon black), 1.5 parts sulphur and 1 part tetramethylthiuramdisulphide, and cured sixty minutes at 130° C., gave a product which was a fairly stiff, tough sheet of rubber.

Example 4

A polyester was prepared as described in Example 1, using 354 grams succinic acid, 98 grams maleic anhydride, 139.5 grams ethylene glycol and 171 grams isopropylene glycol, together with .04 gram zinc chloride as a catalyst. The reaction temperature was 200° C. and the vacuum treatment was continued for twelve hours. The product was a viscous, amber-colored gum containing some gel. The intrinsic viscosity of the product in chloroform was 0.616 and the melt viscosity was 18,000 poises at 90° C. A sample of 100 parts by weight of this polymer was compounded with 50 parts Kalvan, 2 parts sulphur and 2 parts tetramethylthiuramdisulphide and was cured thirty minutes at 140° C. The tensile strength of the cured product was 1350 pounds per square inch and the elongation at break was 260 per cent.

*Example 5*

A polyester was prepared as described in Example 1, using 17.7 grams succinic acid, 7.2 grams dihydromuconic acid, 9.3 grams ethylene glycol and 11.4 grams isopropylene glycol, together with .002 gram zinc chloride as a catalyst, the reaction being carried out at 200° C., the vacuum treatment being continued for five hours. An extremely viscous amber-colored product was produced which contained some gel. A sample of 100 parts by weight of the product was compounded on the mill with 2 parts sulphur and 2 parts tetramethylthiuramdisulphide and was then cured at between 120° C. and 125° C. for seventy-five minutes. The resulting product was a well vulcanized soft, rubbery sheet.

*Example 6*

A polyester was prepared as described in Example 1, using 303 grams commercial sebacic acid, 49 grams maleic anhydride, 142.5 grams isopropylene glycol and 39 grams ethylene glycol, together with 5 grams phenyl beta naphthylamine, the reaction being carried out at 200° C., the vacuum treatment being continued for seventeen hours. A sample of 100 parts by weight of the product was compounded with 75 parts Kalvan, 1 part sulphur and 1 part tetramethylthiuramdisulphide and was cured twenty minutes at 155° C. The resulting product was a soft, rubbery sheet of good strength and good nerve. Similar compounds prepared with equivalent amounts of carbon black in place of Kalvan were considerably stiffer. Two compounds, in one of which the Kalvan was replaced with 60 parts of Dixie clay and in the other of which the Kalvan was replaced with 125 parts Mapico 297 (ultra-fine, pure red oxide of iron), were very soft and suedelike.

*Example 7*

A polyester was prepared as described in Example 1, using 29.1 grams commercial sebacic acid, .588 gram maleic anhydride, 13 centimeters of a mixture containing 75 mol per cent isopropylene glycol and 25 mol per cent ethylene glycol and .7 gram phenyl alpha naphthylamine as an antioxidant, the reaction being carried out at 200° C., the vacuum treatment being continued for thirty hours. The product was a very viscous, amber-colored gum. A sample of 100 parts of the product was compounded with 50 parts Kalvan, 2 parts sulphur and 2 parts tetramethylthiuramdisulphide and cured for ninety minutes at 150° C. The resulting product had a low modulus, indicative of undercure, but, nevertheless, a vulcanizing reaction had definitely taken place.

Although the invention has been described in terms of certain specific embodiments, certain modifications and equivalents will be apparent to those skilled in the art and are intended to be included within the scope of the present invention which is to be limited only by the reasonable scope of the appended claims.

What is claimed is:

1. A cured rubber-like substance comprising sulphur cured polyisopropylene ethylene sebacate maleate in which the isopropylene residue constitutes 75 mol per cent of the total isopropylene and ethylene residues and in which the sebacate residue constitutes 85 per cent of the total sebacate and maleate residues.

2. A cured rubber-like substance comprising sulphur cured polyisopropylene ethylene succinate maleate in which the ethylene and isopropylene residues are present in equimolecular amounts and in which the succinate residue constitutes 75 mol per cent of the total succinate and maleate residues.

3. Sulphur cured polyethylene isopropylene sebacate maleate in which the maleate residue constitutes between 10 mol per cent and 25 mol per cent of the total sebacate and maleate residues.

4. Sulphur cured polyethylene isopropylene succinate maleate in which the maleate residue constitutes between 10 mol per cent and 25 mol per cent of the total succinate and maleate residues.

5. A sulphur cured dihydroxyalkane-dicarboxyalkane-dicarboxyolefin polyester, said polyester prior to curing containing between 3 and 13 olefinic bonds per 400 atoms in the ester chains of the polyester, calculated by assuming no cross-linking between molecules at the unsaturated bonds.

6. A sulphur cured dihydroxyalkane-dicarboxyalkane-maleic acid polyester, said polyester prior to curing containing between 3 and 13 maleic acid derived olefinic bonds per 400 atoms in the ester chains of the polyesters, calculated by assuming no cross-linking between molecules at the unsaturated bonds.

7. A sulphur cured dihydroxyalkane-sebacic acid-maleic acid polyester, said polyester prior to curing containing between 3 and 13 maleic acid derived olefinic bonds per 400 atoms in the ester chains of the polyester, calculated by assuming no cross-linking between molecules at the unsaturated bonds.

8. A sulphur cured dihydroxyalkane-succinic acid-maleic acid polyester, said polyester prior to curing containing between 3 and 13 maleic acid derived olefinic bonds per 400 atoms in the ester chains of the polyester, calculated by assuming no cross-linking between molecules at the unsaturated bonds.

9. A sulphur cured polyethylene isopropylene alkanedicarboxylate maleate in which the maleate residue constitutes between 10 mol per cent and 25 mol per cent of the total alkanedicarboxylate and maleate residues and in which the alkanedicarboxylate residue is a straight-chain-alkane dicarboxylate residue.

10. A sulphur cured isopropylene glycol-dihydroxyalkane-dicarboxyalkane-maleic acid polyester, said polyester prior to curing containing between 3 and 13 olefinic bonds per 400 atoms in the average linear molecular chain as the sole carbon-to-carbon unsaturation, calculated by assuming no cross-linking at the double bonds during formation of the polyester, each dihydroxyalkane and dicarboxyalkane entering into said polyester being a dihydroxy straight-chain-alkane and a dicarboxy straight-chain-alkane, respectively.

11. A sulphur cured dihydroxyalkane-dicarboxalkane-maleic acid polyester wherein the dicarboxyalkane constituent of said polyester is a dicarboxy straight-chain-alkane, said polyester prior to curing containing between 3 and 13 olefinic bonds per 400 atoms in the average linear molecular chain as the sole carbon-to-carbon unsaturation, calculated by assuming no cross-linking at the double bonds during formation of the polyester.

CARL J. FROSCH.

REFERENCES CITED

The following references are of record in the file of this patent:

UNITED STATES PATENTS

| Number | Name | Date |
|---|---|---|
| 1,884,024 | Luther | Oct. 25, 1932 |
| 1,897,133 | Luther | Feb. 14, 1933 |
| 2,018,492 | Grupe | Oct. 22, 1935 |
| 2,105,361 | Nowak | Jan. 11, 1938 |
| 2,174,619 | Carothers | Oct. 3, 1939 |
| 2,326,602 | Allen | Aug. 10, 1943 |
| 2,373,015 | Cowan | Apr. 3, 1945 |
| 2,384,443 | Cowan | Sept. 11, 1945 |

FOREIGN PATENTS

| Number | Country | Date |
|---|---|---|
| 537,865 | Germany | Nov. 7, 1931 |

OTHER REFERENCES

Vincent, Ind. and Eng. Chem., vol. 29, pages 1267–1269, Nov. 1937.